(12) United States Patent
Sarshar

(10) Patent No.: US 9,846,885 B1
(45) Date of Patent: Dec. 19, 2017

(54) METHOD AND SYSTEM FOR COMPARING COMMERCIAL ENTITIES BASED ON PURCHASE PATTERNS

(71) Applicant: Nima Sarshar, Mountain View, CA (US)

(72) Inventor: Nima Sarshar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 877 days.

(21) Appl. No.: 14/266,719

(22) Filed: Apr. 30, 2014

(51) Int. Cl.
  *G06Q 10/00* (2012.01)
  *G06Q 30/00* (2012.01)
  *G06Q 30/02* (2012.01)

(52) U.S. Cl.
  CPC .............. *G06Q 30/0201* (2013.01)

(58) Field of Classification Search
  CPC ........... G06F 1/00–21/00; G06Q 10/00–50/00; H04L 1/00–69/00
  See application file for complete search history.

(56) References Cited

U.S. PATENT DOCUMENTS

| | | | | |
|---|---|---|---|---|
| 5,138,694 A * | 8/1992 | Hamilton | ............ | G06F 11/2257 706/10 |
| 5,495,606 A * | 2/1996 | Borden | ............. | G06F 15/17375 |
| 5,793,964 A * | 8/1998 | Rogers | ............. | G06F 17/30893 707/E17.117 |
| 5,835,755 A * | 11/1998 | Stellwagen, Jr. | .. | G06F 17/30445 707/764 |
| 5,873,083 A * | 2/1999 | Jones | ................ | G06F 17/30595 |
| 6,128,608 A * | 10/2000 | Barnhill | ............... | G06K 9/6256 706/12 |
| 6,157,921 A * | 12/2000 | Barnhill | ............... | G06K 9/6256 706/16 |
| 6,266,668 B1 * | 7/2001 | Vanderveldt | ...... | G06F 17/30867 |
| 6,427,141 B1 * | 7/2002 | Barnhill | ............... | G06K 9/6256 706/12 |
| 6,470,277 B1 * | 10/2002 | Chin | ....................... | G06F 19/28 702/19 |
| 6,470,333 B1 * | 10/2002 | Baclawski | .......... | G06F 17/3033 |
| 6,606,622 B1 * | 8/2003 | Sorace | .................... | G06F 19/28 |

(Continued)

OTHER PUBLICATIONS

Su, Xiaoyuan, and Taghi M. Khoshgoftaar. "A survey of collaborative filtering techniques." Advances in artificial intelligence 2009 (2009): 4.*

(Continued)

*Primary Examiner* — Alan S Miller
(74) *Attorney, Agent, or Firm* — Osha Liang LLP

(57) ABSTRACT

A method for comparing purchase patterns includes matching multiple products purchased by a base company to multiple leaf nodes in a taxonomy tree to obtain multiple matching leaf nodes. The taxonomy tree is a hierarchical classification of products. The method further includes assigning, to each of the matching leaf nodes and to each parent node of the matching leaf nodes, a point value to obtain multiple point values, creating, for the base company and by a computer processor, a base feature vector including the point values, and calculating, by the computer processor, a similarity score between the base feature vector of the base company to a test feature vector of a test company. The method further includes providing, in response to the similarity score satisfying a similarity threshold, a recommendation.

29 Claims, 9 Drawing Sheets

(56) References Cited

U.S. PATENT DOCUMENTS

| | | | | |
|---|---|---|---|---|
| 6,658,395 | B1* | 12/2003 | Barnhill | G06K 9/6256 706/12 |
| 6,789,091 | B2* | 9/2004 | Gogolak | G06F 19/326 |
| 6,836,773 | B2* | 12/2004 | Tamayo | G06F 17/30864 |
| 6,882,990 | B1* | 4/2005 | Barnhill | G06F 19/24 706/12 |
| 7,117,188 | B2* | 10/2006 | Guyon | G06F 19/24 706/19 |
| 7,318,051 | B2* | 1/2008 | Weston | G06K 9/6215 706/12 |
| 7,444,308 | B2* | 10/2008 | Guyon | G06F 19/24 706/12 |
| 7,475,048 | B2* | 1/2009 | Weston | G06K 9/623 702/19 |
| 7,542,947 | B2* | 6/2009 | Guyon | G06F 19/24 706/12 |
| 7,624,074 | B2* | 11/2009 | Weston | G06K 9/6231 706/1 |
| 7,805,388 | B2* | 9/2010 | Weston | C12Q 1/6883 702/19 |
| 7,921,068 | B2* | 4/2011 | Guyon | G06F 19/24 706/45 |
| 7,970,718 | B2* | 6/2011 | Guyon | G06F 19/24 706/15 |
| 8,229,866 | B2* | 7/2012 | Alaniz | G06K 9/00496 706/12 |
| 8,538,774 | B2* | 9/2013 | Michelson | G06F 19/24 705/2 |
| 8,930,914 | B2* | 1/2015 | Cohen | G06F 11/3476 717/127 |
| 9,043,758 | B2* | 5/2015 | Frenkiel | G06F 8/73 717/123 |
| 9,349,135 | B2* | 5/2016 | Sarshar | G06Q 30/0256 |
| 2002/0049704 | A1* | 4/2002 | Vanderveldt | G06F 17/30867 |
| 2002/0052882 | A1* | 5/2002 | Taylor | G06T 11/206 |
| 2002/0095260 | A1* | 7/2002 | Huyn | G06F 19/24 702/19 |
| 2002/0111742 | A1* | 8/2002 | Rocke | G06F 19/24 702/19 |
| 2002/0119462 | A1* | 8/2002 | Mendrick | C12Q 1/6876 435/6.14 |
| 2002/0120405 | A1* | 8/2002 | Edwards | C07K 1/00 702/19 |
| 2002/0133504 | A1* | 9/2002 | Vlahos | G06F 17/30566 |
| 2003/0009295 | A1* | 1/2003 | Markowitz | G06F 19/28 702/20 |
| 2003/0100999 | A1* | 5/2003 | Markowitz | G06F 19/28 702/20 |
| 2003/0171876 | A1* | 9/2003 | Markowitz | G06F 19/28 702/20 |
| 2006/0064415 | A1* | 3/2006 | Guyon | G06F 19/24 |

OTHER PUBLICATIONS

Demiriz, Ayhan. "Enhancing product recommender systems on sparse binary data." Data Mining and Knowledge Discovery 9.2 (2004): 147-170.*

Ester, Martin, Hans-Peter Kriegel, and Matthias Schubert. "Web site mining: a new way to spot competitors, customers and suppliers in the world wide web." Proceedings of the eighth ACM SIGKDD international conference on Knowledge discovery and data mining. ACM, 2002.*

* cited by examiner

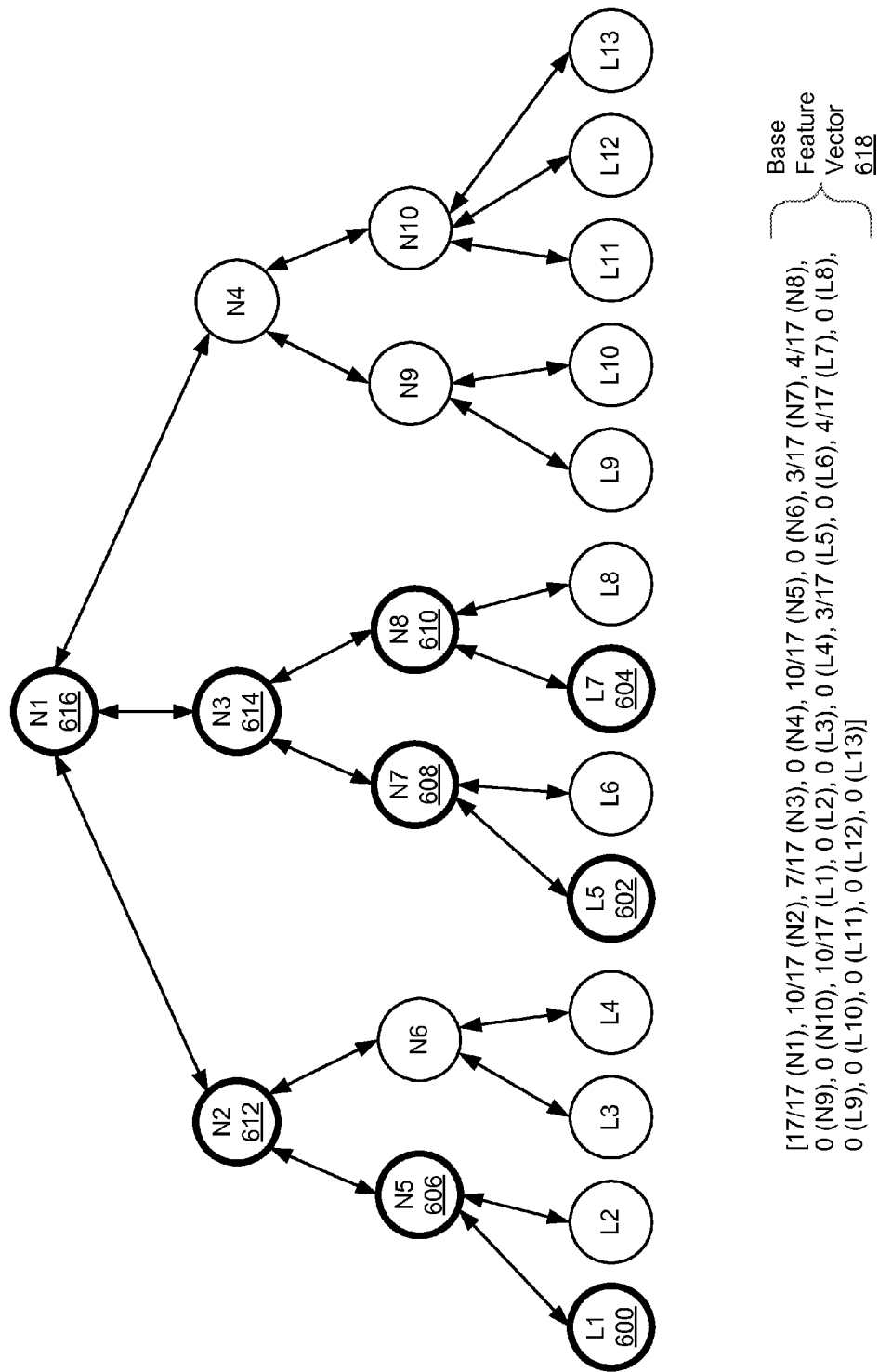
FIG. 6.1

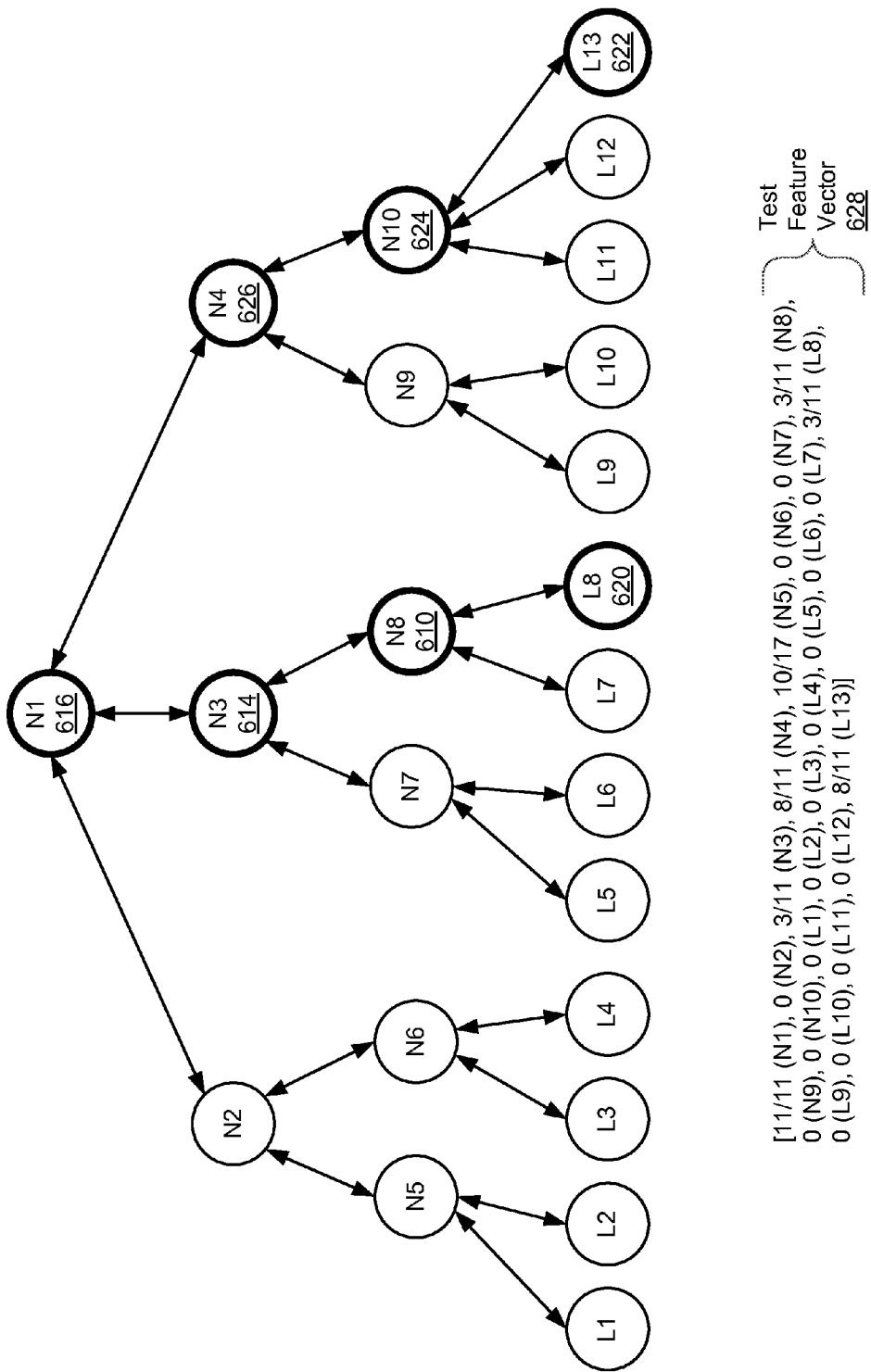
FIG. 6.2

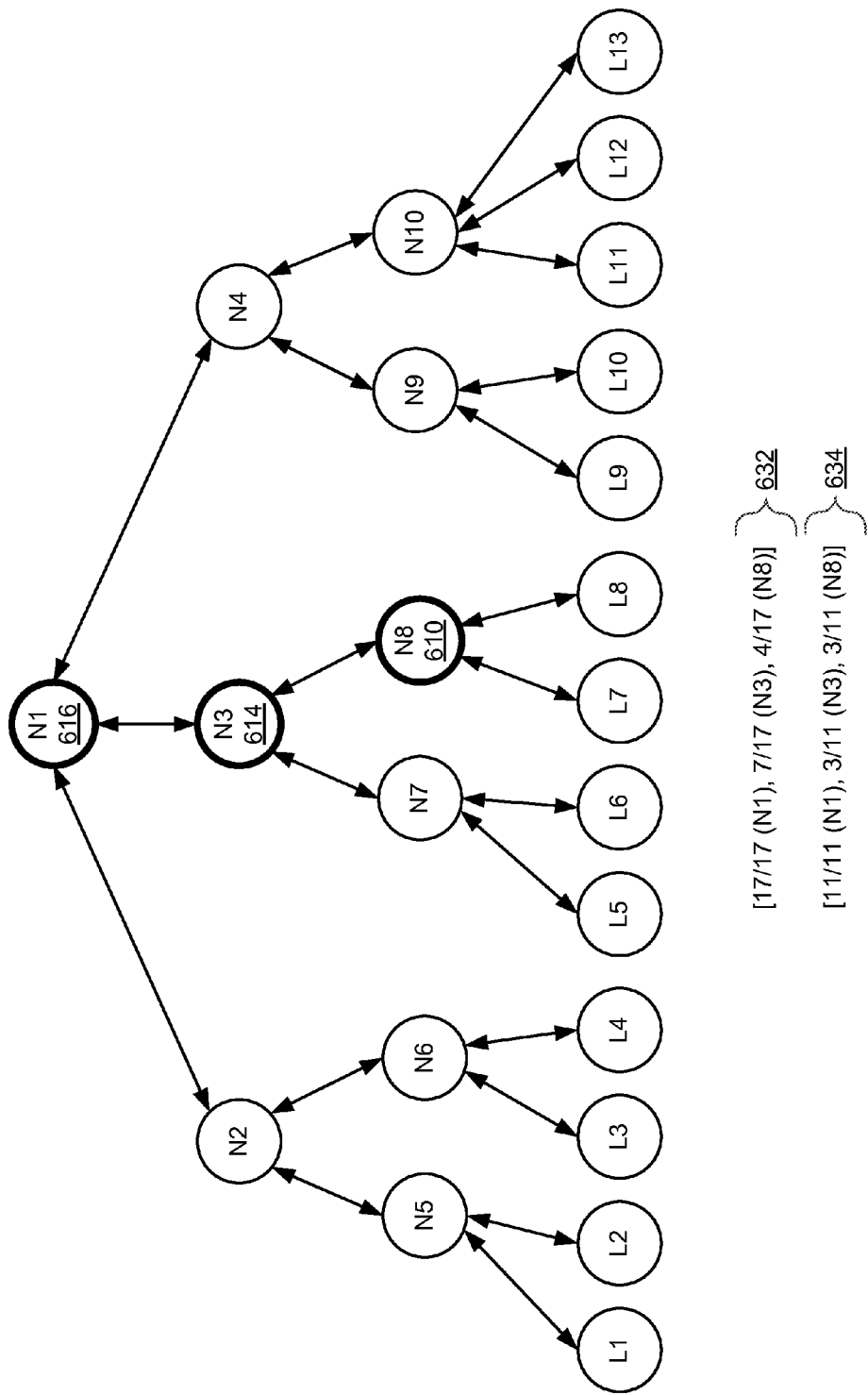
FIG. 6.3

METHOD AND SYSTEM FOR COMPARING COMMERCIAL ENTITIES BASED ON PURCHASE PATTERNS

BACKGROUND

In general, a commercial entity, such as a company, purchases and sells products. The company may track the products purchased and sold through a transaction history. The area of business the company is involved in may be described by the products in the transaction history.

SUMMARY

In general, in one aspect, embodiments relate to a method for comparing purchase patterns, including matching multiple products purchased by a base company to multiple leaf nodes in a taxonomy tree to obtain multiple matching leaf nodes. The taxonomy tree is a hierarchical classification of products. The method further includes assigning, to each of the matching leaf nodes and to each parent node of the matching leaf nodes, a point value to obtain multiple point values, creating, for the base company and by a computer processor, a base feature vector including the point values, and calculating, by the computer processor, a similarity score between the base feature vector of the base company to a test feature vector of a test company. The method further includes providing, in response to the similarity score satisfying a similarity threshold, a recommendation.

In general, in one aspect, embodiments relate to a system for comparing purchasing patterns, including a computer processor, and a classification engine, executing on the computer processor. The classification engine includes a feature vector generation module configured to match multiple products purchased by a base company to multiple leaf nodes in a taxonomy tree to obtain multiple matching leaf nodes, where the taxonomy tree is a hierarchical classification of products, assign to each of the matching leaf nodes and to each parent node of the matching leaf nodes, a point value to obtain multiple point values, and create, for the base company, a base feature vector including the point values. The classification engine further includes a similarity score generation module configured to calculate a similarity score between the base feature vector of the base company to a test feature vector of a test company, and provide, in response to the similarity score satisfying a similarity threshold, a recommendation.

In general, in one aspect, embodiments relate to a non-transitory computer-readable storage medium storing multiple instructions for comparing purchase patterns, the instructions including functionality to match multiple products purchased by a base company to multiple leaf nodes in a taxonomy tree to obtain multiple matching leaf nodes, where the taxonomy tree is a hierarchical classification of products. The instructions further include functionality to assign, to each of the matching leaf nodes and to each parent node of the matching leaf nodes, a point value to obtain multiple point values, create, for the base company, a base feature vector including the point values, calculate a similarity score between the base feature vector of the base company to a test feature vector of a test company, and provide, in response to the similarity score satisfying a similarity threshold, a recommendation.

In general, in one aspect, embodiments relate to a method for comparing sell patterns, including matching multiple products sold by a base company to multiple leaf nodes in a taxonomy tree to obtain multiple matching leaf nodes. The taxonomy tree is a hierarchical classification of products. The method further includes assigning, to each of the matching leaf nodes and to each parent node of the matching leaf nodes, a point value to obtain multiple point values, creating, for the base company and by a computer processor, a base feature vector including the point values, and calculating, by the computer processor, a similarity score between the base feature vector of the base company to a test feature vector of a test company. The method further includes providing, in response to the similarity score satisfying a similarity threshold, a recommendation.

Other aspects of the invention will be apparent from the following description and the appended claims.

BRIEF DESCRIPTION OF DRAWINGS

FIGS. 6.1-6.3 show an example in accordance with one or more embodiments of the invention.

DETAILED DESCRIPTION

Figure 1:
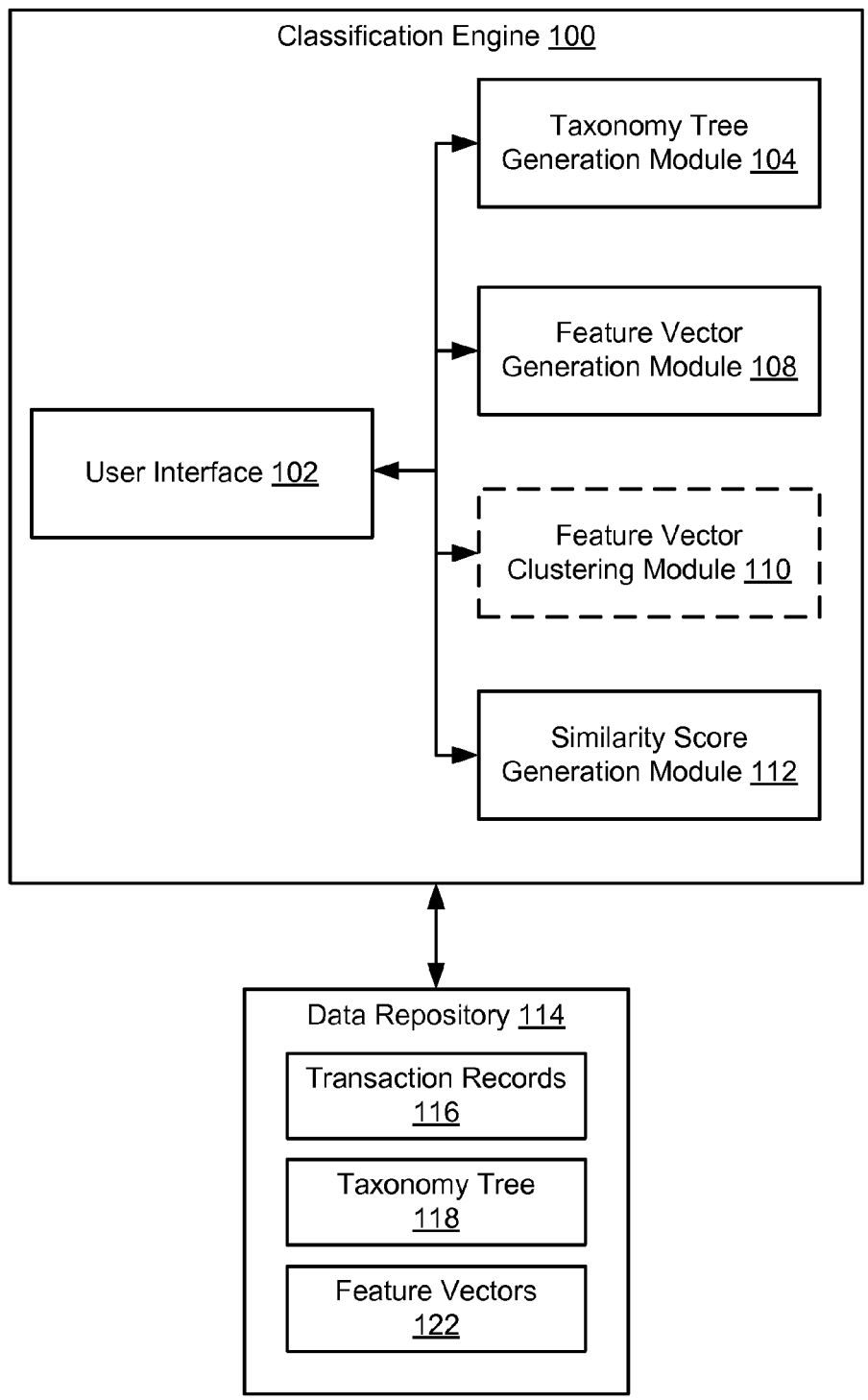
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for comparing companies for similarity based on the products purchased or sold by each company to provide recommendations. Specifically, embodiments of the invention classify each company based on product information from transaction records of the company. Point values of a company may then be aggregated in a feature vector that is used to calculate the similarity score to the feature vector of another company. In one or more embodiments of the invention, the determination that companies are similar may be used to offer recommendations.

FIG. 1 shows a schematic diagram of a system in accordance with one or more embodiments of the invention. As shown in FIG. 1, the system includes a data repository (114) and a classification engine (100). Both of these components are described below.

In one or more embodiments of the invention, the data repository (114) is any type of storage unit and/or device (e.g., a file system, database, collection of tables, or any other storage mechanism) for storing data. Further, the data repository (114) may include multiple different storage units and/or devices. The multiple different storage units and/or devices may or may not be of the same type or located at the same physical site.

In one or more embodiments of the invention, the data in the data repository includes transaction records (116), a taxonomy tree (118) and feature vectors (122).

In one or more embodiments of the invention, transaction records (116) are records of transactions. Each transaction is an instance in which a company purchases or sells at least one product. For example, a transaction between an apple company and a customer may be selling three gala apples for one dollar. A product includes goods and services that a company sells or buys. For example, the apple company sells customers apples as a product, including gala apples, red delicious apples, and McIntosh apples.

A transaction record includes the products sold, the products purchased, the product information of the products, the volume of the product, the sell or purchase price of the product, and the date of the transaction. The product information includes keywords that describe a product. Keywords may include a word or phrase. For example, consider the scenario, which a user purchases three red gala apples from California for $1.00 on Aug. 12, 2012. The product information of the gala apple is red gala apple from California. The keywords may be red gala apple. A transaction record of the apple company may identify the three red gala apples from California, the sale, Aug. 12, 2012, and $1.00.

In one or more embodiments of the invention, the product information includes product codes. Product codes are unique identifiers that identify a product. For example, a UPC code of a product is mapped to identify the product.

In one or more embodiments of the invention, the taxonomy tree (118) is the hierarchical classification of products. The hierarchical classification of products is the arrangement of products into classes. A class is a grouping of products that share a commonality, including an attribute. An attribute is an inherent property or characteristic of a product. For example, a green pepper may be in the following classes, according to the hierarchical classification, vegetables based on having the attribute of being grown on a plant, and food as the green pepper has the attribute of being edible.

The taxonomy tree (118) includes at least one node. A node is an element of the taxonomy tree (118). A node stores data, including at least one product keyword. For example, a node in the taxonomy tree of products may be vegetable. A node that does not have at least one node that directly follows the node is a leaf node. A leaf node in the taxonomy tree (118) of products may correspond to an individual product. For example, a leaf node in the taxonomy tree of products may be a green pepper.

In one or more embodiments of the invention, the feature vector (122) is a measurement of a set of features of a company. Each feature is a separate and distinct element in the feature vector (122). Each feature may correspond to a point value of a corresponding node in the taxonomy tree (118). Each point value is a numerical value assigned to each node in the taxonomy tree (118). For example, given a taxonomy tree (118) that includes three nodes, node 1 of the tree has a point value of 2, node 2 of the tree has a point value of 2 and node 3 in the tree has a point value of 5. The feature vector (122) may then be [2, 2, 5].

The data repository (114) is connected to a classification engine (100) in accordance with one or more embodiments of the invention. The classification engine (100) may correspond to software, hardware, and/or firmware that generates the taxonomy tree (118), creates a feature vector (122) for a company, calculates a similarity score between a base feature vector of a base company to a test feature vector of test company, and provides a recommendation based on a calculated similarity score.

A base company is a company that is selected to request recommendations by finding similar companies to the base company. A base feature vector is the feature vector of a base company. A test company is a company that is compared to the base company to determine similarity of the base company and test company. A test feature vector is the feature vector of the test company. The test company is similar to the base company when the similarity score between the two companies is above a similarity threshold.

In one or more embodiments of the invention, the recommendation may be based on the similarity threshold. The similarity threshold may correspond to a numerical value. For example, a customer is seeking a similar company to a bathing suit company. The similarity score of the bathing suit company and a general retail store is forty. The similarity threshold is set to thirty. The bathing suit company and the general retail store are similar, since the similarity score is above the similarity threshold. In the previous example, the bathing suit company is a base company and the general retail store is a test company.

The classification engine (100) may include a taxonomy tree generation module (104), a feature vector generation module (108), a feature vector clustering module (110), a similarity score generation module (112), and a user interface (102). Each component is described below.

In one or more embodiments of the invention, the taxonomy tree generation module (104) includes functionality to identify a set of products from keywords in the product information in the transaction records (116) of the companies. The taxonomy tree generation module (104) includes further functionality to generate a taxonomy tree (118).

In one or more embodiments of the invention, the feature vector generation module (108) includes functionality to create a feature vector (122) for a company by assigning each element in the feature vector with the point value assigned to a node in the taxonomy tree (118).

In one or more embodiments of the invention, the feature vector clustering module (110) includes functionality to generate clusters of companies based on the feature vectors (122) of the companies. Each cluster is a group of companies. The companies within the same cluster are more similar based on the feature vectors of the companies compared to companies in different clusters. For example, a deli, a grocery store and a pet store may be clustered into two clusters. The first cluster includes the deli and grocery store and the second cluster includes the pet store.

In one or more embodiments of the invention, the similarity score generation module (112) includes functionality to calculate a similarity score. The similarity score is calculated between the elements in a base feature vector of a base company to the elements in a test feature vector of a test company. For example, each element in a base feature vector of a base company may be multiplied by the corresponding element in a test feature vector of a test company. Each multiplication product may then be summed to obtain the similarity score. In one or more embodiments of the invention, the similarity score generation module (112) includes further functionality to provide a recommendation of similar companies.

A recommendation is a proposal on the course of action of a user based on finding that a base company is similar to a test company. A recommendation includes a suggestion, advice, referral, an advertisement, or a combination thereof. The suggestion may correspond to a recommendation to a vendor of the base company that a test company as an additional company to which the vendor may market. For example, a deli receives a suggestion to sell deli meat to an additional grocery store in the neighborhood, since the additional grocery store is similar to a current grocery store the deli supplies. The advertisement may correspond to a recommendation to a customer of a base company that a test company is an alternate company from which the customer may purchase products. For example, the advertisement may be to a sports equipment store that buys similar equipment to the equipment the customer buys at a general retail store.

In one or more embodiments of the invention, a user interface (102) provides the user with an interface, including a graphical user interface, to manage the classification engine (100). Specifically, the user interface (102) includes functionality to receive input from the user corresponding to the user's selection of a base company to compare. In one or more embodiments of the invention, the user interface (102) further includes functionality to present a recommendation to the user based on similar companies.

While FIG. 1 shows a configuration of components, other configurations may be used without departing from the scope of the invention. For example, various components may be combined to create a single component. As another example, the functionality performed by a single component may be performed by two or more components.

Figure 2:
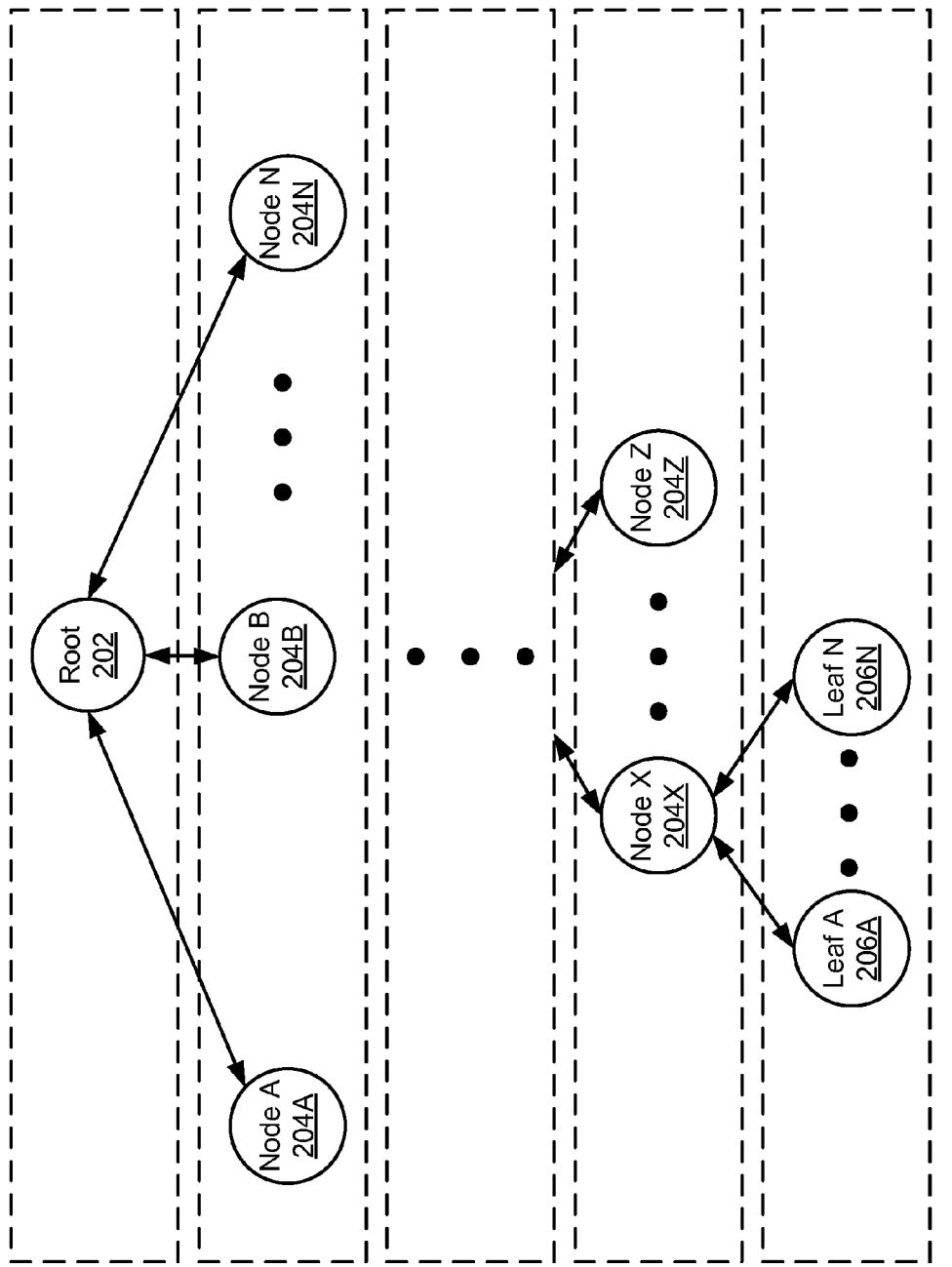

FIG. 2 shows a taxonomy tree in accordance with one or more embodiments of the invention. The taxonomy tree includes a root node (202), one or more intermediary nodes (e.g., node A (204A), node B (204B), node N (204N), node X (204X), and node Z (204Z)), and one or more leaf nodes (e.g., leaf A (206A) and leaf N (206N)). Relationships between the nodes (e.g., root node, intermediary nodes, leaf nodes) describe the structure of the taxonomy tree. A parent node in the taxonomy tree has a node directly following the parent node. The node that directly follows the parent node corresponds to the child node. The leaf nodes are the nodes in the taxonomy tree that have no child nodes.

The parent child relationship in the taxonomy tree indicates that the product or class of products represented by the child is a member of the class of products represented by the parent. Specifically, in one or more embodiments of the invention, the leaf nodes correspond to the individual products. Intermediary nodes are the parent nodes of the leaf nodes. As parents of the leaf nodes, the intermediary nodes correspond to classes of products that include the individual products the leaf nodes represent. Intermediary nodes (node A (204A), node B (204B), node N (204N)) are parents of the intermediary nodes (node X (204X), and node Z (204Z)). Intermediary nodes (node A (204A), node B (204B), node N (204N)) correspond to classes of products that include the intermediary nodes (node X (204X), and node Z (204Z)) and leaf nodes. As the parent of the set of intermediary nodes in the taxonomy tree, the root node (202) corresponds to the class that includes intermediary nodes and leaf nodes.

For example, leaf A (206A) may be a model of a wrench, such as a combination wrench. Node X (204X) may be the class of wrenches, including the combination wrench represented by leaf A (206A). Another parent intermediary node (not shown) may be the class of non-electric hardware tools, including wrenches represented by node X (204 X) and the combination wrench represented by leaf A (206A). Node B (204B) may be the class of building supplies, including non-electric hardware tools represented as the node (not shown), wrenches represented as node X (204X) and the combination wrench represented as leaf node A (206A). The root node (202) may be all retailers.

One skilled in the art will recognize that the number of nodes and leaf nodes in the taxonomy tree may vary depending on the requirements that the taxonomy tree is designed to meet without departing from the invention.

Figure 3:
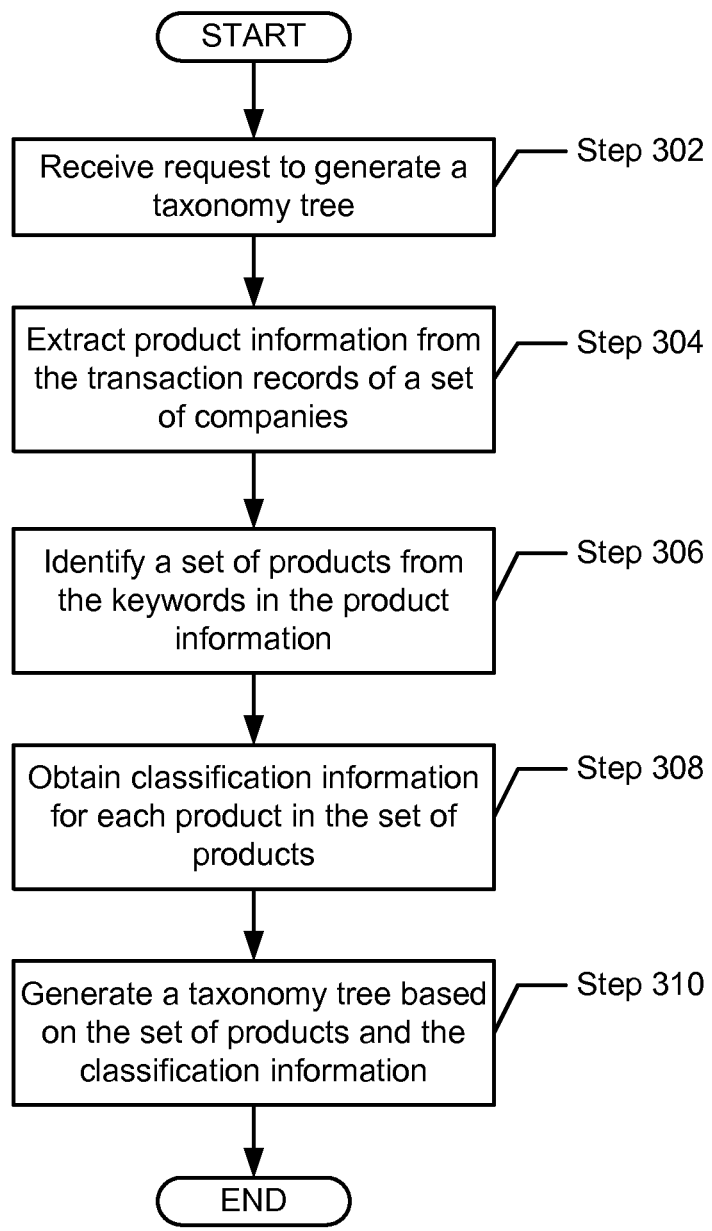
FIGS. 3-5 show flowcharts in accordance with one or more embodiments of the invention.
Figure 4:
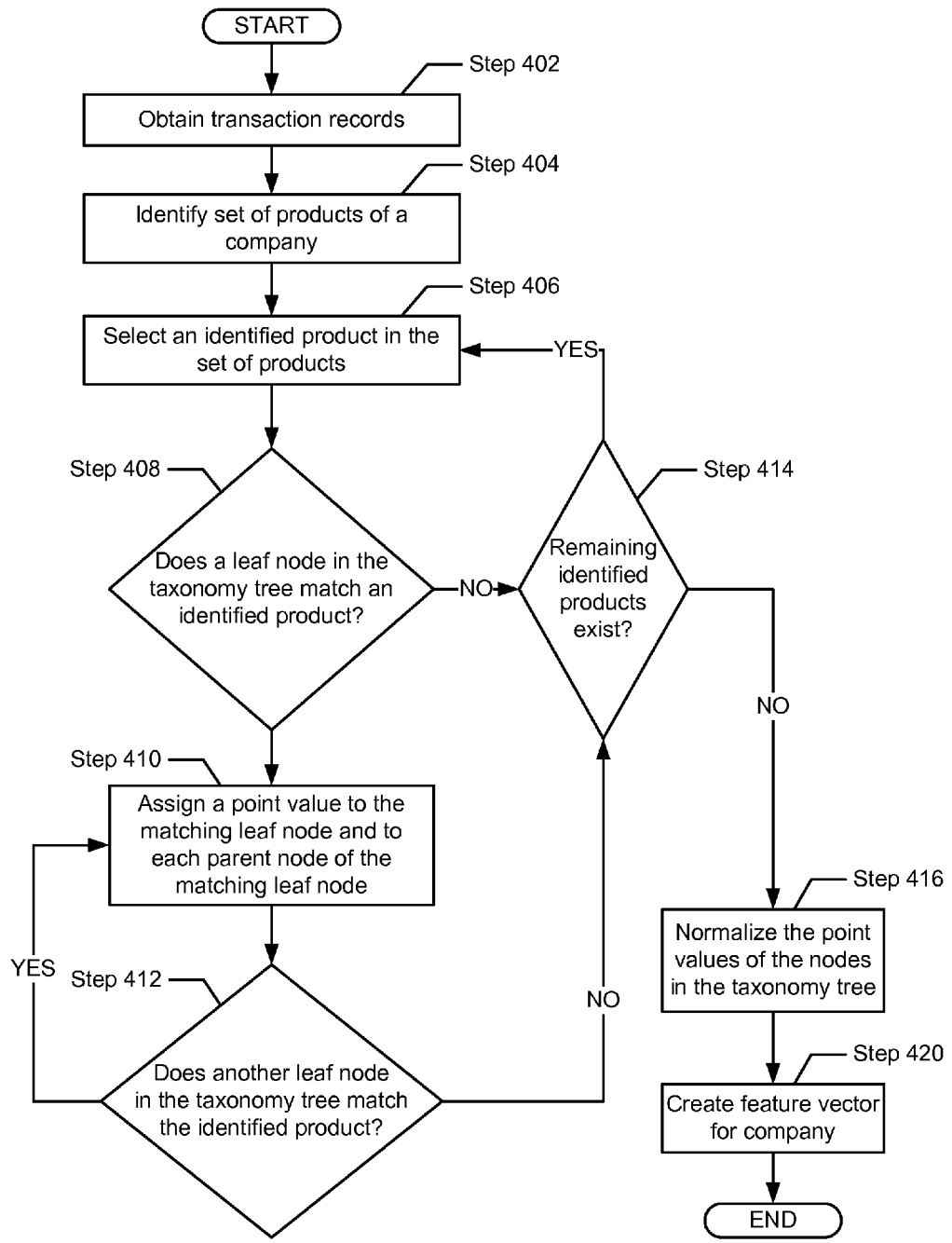
Figure 5:
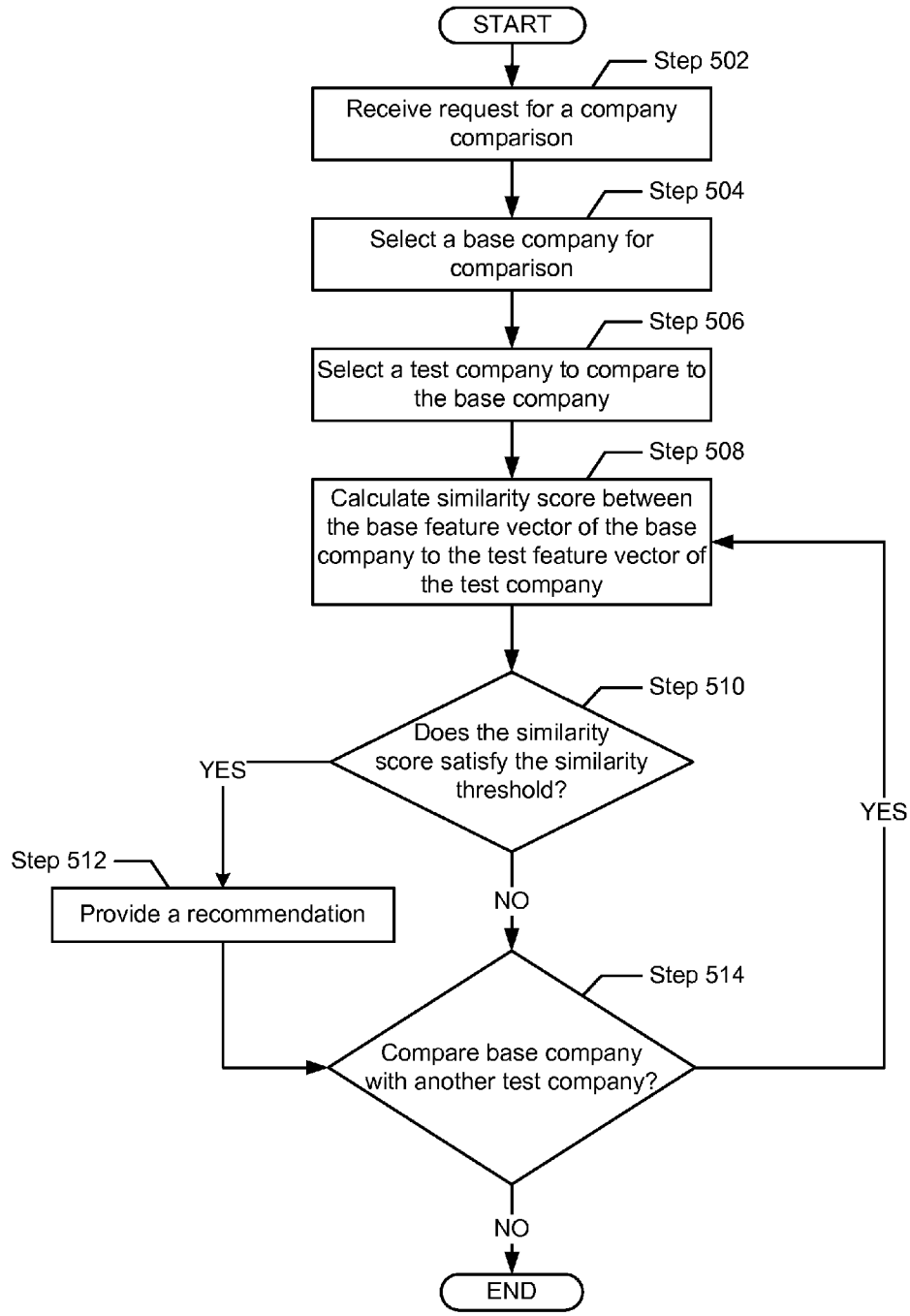

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for generating a taxonomy tree using the taxonomy tree generation module in the classification engine in accordance with one or more embodiments of the invention. In Step 302, the taxonomy tree generation module receives a request to generate a taxonomy tree. In one or more embodiments of the invention, the request to generate the taxonomy tree is received to ensure that the data in the taxonomy tree is up-to-date.

In one or more embodiments of the invention, the request may be generated by the initialization of the classification engine. The request may also be issued periodically by an administrator of the classification engine through a user interface or an application programming interface (API). An administrator may correspond to a lead software developer, a member of a quality assurance team, or any person maintaining the classification engine. For example, the lead software developer may configure the API to generate the taxonomy tree every day at 1 am. Further, the addition of a company's transaction records in the data repository may trigger the classification engine to issue a request to generate a taxonomy tree.

In Step 304, transactions records of a set of companies are obtained from the data repository. For each company in the set of companies, product information is then extracted from the transaction records of the company. In one or more embodiments of the invention, the product information is extracted by normalizing the transaction record to select the text that corresponds to the product information of the transaction record. In one or more embodiments of the invention, the product information includes product codes. To extract the product information, rows in a receipt or invoice are selected if there is a corresponding price in one of the columns in the row. Alternatively or additionally, receipt or invoice templates that have section identifiers specifying where the description is located may be used to identify the position of the product identifiers In one or more embodiments of the invention, the extracted product information of each product in Step 304 includes keywords that describe the product. In Step 306, a set of products are identified from the keywords in the product information. In one or more embodiments of the invention, a keyword may be selected by first normalizing the product information to remove any encoded words or phrases. For example, chkn hplr is normalized to remove the encoding and decode to the chicken helper product. The keywords are then extracted from the normalized product information. In one or more embodiments of the invention, the product information includes product codes, such as a universal product code (UPC). A UPC is a unique identifier that includes numeric characters and identifies a product. Keywords may then be selected by mapping a product code to a product in the set of products. The output of mapping the product code may also require normalization to decode the product as described above. Other methods for normalization may be performed without departing from the scope of the invention.

In Step 308, classification information is obtained for each product in the set of products identified in Step 306 in one or more embodiments of the invention. In one or more embodiments of the invention, the classification information is obtained from a third party source, including companies in e-commerce. The classification information is contextual knowledge of the taxonomy of a product. For example, contextual knowledge of the taxonomy of a wrench includes that the wrench is a hand tool.

In Step 310, a taxonomy tree is generated based on the set of products identified in Step 306 and the classification information obtained in Step 308 in one or more embodiments of the invention. For example, hand tool, wrench, and hammer are keywords extracted from product information. Classification information obtained for a hammer includes that the hammer is a hand tool. Classification information obtained for a wrench includes that the wrench is a hand tool. A node in the taxonomy tree may be a hand tool node based on the keywords hand tool. The child node of the hand tool node is a hammer node based on the keyword and classification information. A second child node of the hand tool node is a wrench node based on the keyword and classification information. In one or more embodiments of the invention, the generated taxonomy tree is stored in the data repository.

FIG. 4 shows a flowchart for creating a feature vector of a company using the feature vector generation module in the classification engine in accordance with one or more embodiments of the invention. In Step 402, the transaction records of a company are obtained. The transaction records may be obtained, for example, from a financial application that tracks the financial transactions performed by the company. In one or more embodiments of the invention, the transaction records are obtained from the data repository.

In Step 404, a set of products are identified in the transaction records obtained in Step 402. Specifically, the set of products are identified from keywords in the product information in the transaction records. In one or more embodiments of the invention, keywords may be selected from the product information by first normalizing the product information to decode words or phrases. The keywords are then extracted from the normalized product information. In one or more embodiments of the invention, the product information includes product codes. Keywords may then be selected by mapping each product code to a product in the set of products. The output of mapping the product code may also require normalization to decode the product as described above. In Step 406, an identified product in the set of products is selected. The selection of keywords for the set of products of a company and selecting one of the identified products may be performed in parallel or serially.

In Step 408, a determination is made whether a leaf node in the taxonomy tree matches the identified product selected in Step 406 in accordance with one or more embodiments of the invention. In one or more embodiments of the invention, matching the identified product includes matching the product keyword of the identified product to keywords annotated on a leaf node of the taxonomy tree. The matching may correspond to an identical product keyword to at least one of the keywords annotated on a leaf node.

If a determination is made that a leaf node in the taxonomy tree matches the identified product, then the method may proceed to Step 410. In Step 410, a point value is assigned to the matching leaf node. In one or more embodiments of the invention, the point value may be assigned based on factors. Factors are properties of the identified product extracted from transaction records of a company. Factors include the volume of the identified product purchased or sold, the price of the identified product, and the frequency of purchase of the identified product in the transaction record.

The point value may be based on a single factor. For example, a pink gel pen that is ten dollars may get a point value of ten, while a blue ball point pen that is one dollar may get a point value of one. The point value may also be based on a combination of the factors. For example, one pink gel pen that is ten dollars may get a point value of ten, while twenty four blue ball point pens that are one dollar each may get a point value of twenty four. In the previous example, the price of an identified product is multiplied by the volume of the identified product sold. In one or more embodiments of the invention, the point value assigned to the matching leaf node propagates the taxonomy tree from the matching leaf node to each parent node of the matching leaf node in the taxonomy tree. For example, the point value of twenty four assigned to the blue ball point pen leaf node is propagated up to the parent of the blue ball point pen leaf node. The parent node may be a pen node. The point value then propagates to the parent of the pen node. The propagation of the point value continues until the root node of the tree is the parent of a node.

In Step 412, a determination is made whether another leaf node in the taxonomy tree matches the identified product selected in Step 406 in accordance with one or more embodiments of the invention. In one or more embodiments of the invention, the identified product may match multiple leaf nodes in the taxonomy tree. For example, gel pen is the identified product and matches the pink gel pen leaf node and the green gel pen leaf node in the taxonomy tree.

If a determination is made that another leaf node in the taxonomy tree matches the identified product, then the method may return to Step 410. If a determination is made that another leaf node in the taxonomy tree does not match the identified product, then the method proceeds to Step 414.

In Step 414, a determination is made whether remaining identified products exist in the set of products identified in the transaction records of a company. In one or more embodiments of the invention, multiple products are identified from transaction records of a company to create the set of products. Each identified product in the set of products is matched to the leaf nodes in the taxonomy tree. The determination in Step 414 determines whether the set of products is not an empty set.

If a determination is made that remaining identified products exist, the method may return to Step 406. If a determination is made that remaining identified products do not exist, the method may proceed to Step 416.

In Step 416, the points values of the nodes in the taxonomy tree are normalized in one or more embodiments of the invention. A node may have multiple point values assigned. For example, consider the scenario in which a jasmine tea node and a gunpowder tea node are both child nodes of a green tea node reflecting that green tea is a class that includes jasmine and gunpowder teas. The green tea node receives a point value of two from propagating the value from the jasmine tea node and a point value of five from propagating the value from the gunpowder tea. Thus, the green tea node has two point values in the example.

Normalizing includes weighting the multiple point values at each node to produce a point value at each node in accordance with one or more embodiments of the invention. In one or more embodiments of the invention, weighting the multiple point values corresponds to applying a predefined mathematical function, including a weighted average and logarithm of a summation of the multiple point values. The weighted average of the multiple point values may be represented by the following equation $$\left( y = \frac{\sum_{n=1}^{N} x}{\sum_{m=1}^{M} z} \right),$$

where x corresponds one point value in the set of the multiple point values at a node, N corresponds to the number of point values in the set of multiple point values, z corresponds to one point value in the set of the point values assigned to the set of matching leaf nodes of the taxonomy tree from the set of products of a company, and M corresponds to the number of point values in the set of point values assigned to the set of matching leaf nodes. The logarithm of the summation of the multiple point values may be represented by the following equation $$\left( y = \log\left( \sum_{n=1}^{N} x \right) \right),$$

where x corresponds one point value in the set of the multiple point values at a node and N corresponds to the number of point values in the set of multiple point values. The predefined mathematical function combines the multiple point values into a single point value at each node (shown as y in the previous formulas).

For example, a pink gel pen matches the pink gel pen leaf node and a point value of three is assigned to the pink gel pen leaf node. A purple gel pen matches the purple gel pen leaf node and a second point value of four is assigned to the purple gel pen leaf node. The gel pen node is the parent of the pink gel pen node and the purple gel pen node. The first point value and the second point value propagate the taxonomy tree to the gel pen node. The first point value and second point value are normalized to produce a point value at the gel point node. In one or more embodiments of the invention, normalizing may include adding the point values assigned to the set of matching leaf nodes to produce a summation. Multiple point values at each parent node are added and then divided by the summation to obtain the point value after normalization. Said another way, the weighted average is taken by dividing the point values at the gel pen node by a value corresponding to the summation of the point values assigned to the set of matching leaf nodes.

In Step 420, a feature vector for a company is created. In one or more embodiments of the invention, each point value assigned to each node in the taxonomy tree is an element in the feature vector. Each feature vector of each company is the same size. The size of the feature vector corresponds to the number of nodes in the taxonomy tree.

Returning to Step 408, if alternatively a determination is made that a matching leaf node does not exist in the taxonomy tree, then the method may proceed to Step 414.

FIG. 5 shows a flowchart for a company comparison using the similarity score generation module in the classification engine in accordance with one or more embodiments of the invention. In Step 502, a request is received for a company comparison. In one or more embodiments of the invention, the request may be issued by a user of the classification engine through the user interface. For example, a user may be a customer that finds a product from a base company however the product is sold out. The customer may then use the user interface to select companies that are nearby to see if the product is available from a similar company. In another example, a vendor may need to increase sales. The vendor uses the user interface to search the companies to find multiple similar companies to approach and sell products. Other triggers for the comparisons may be used without departing from the scope of the invention.

In one or more embodiments of the invention, the request may be issued automatically by a current task the user performs on a computing device (e.g. tablet, smartphone, laptop, desktop). A current task may include a search in a browser, an online purchase, and websites visited by the user. For example, the user may search in a browser for a product. The search triggers the similarity score generation module in the classification engine to find similar companies that sell similar products to the one searched by the user to advertise to the user.

In Step 504, a base company is selected for comparison. In one or more embodiments of the invention, the base company may be selected by the user of the classification engine through the user interface. Specifically, the user may type a base company name in a base company input field on the user interface. Further, the user may select a base company from a base company drop down list on the user interface. In one or more embodiments of the invention, the base company may be automatically selected by a current task of the user. For example, a user may visit a company's webpage more frequently than another webpage. The classification engine may then extract that the user has a preference for the products of the company. The classification engine may then select the company as the base company to find similar companies to the company to advertise to the user.

In Step 506, a test company is selected to compare to the base company selected in Step 504. In one or more embodiments of the invention, the test company may be selected by the user of the classification engine through the user interface. Specifically, the user may type a test company name in a test company input field on the user interface. Further, the user may select a test company from a test company drop down list on the user interface. Finally, the classification engine may offer suggestions of test companies to run the comparison based on the base company entered in Step 504. For example, the classification engine may suggest test companies that are located the closest to the base company.

In Step 508, a similarity score is calculated between the base feature vector of the base company and the test feature vector of the test company. In one or more embodiments of the invention, calculation of the similarity score includes a summation of each score calculated between an element in the base feature vector to the corresponding element in the test feature vector. The calculation may be performed using the following equation:

$$similarityScore = \sum_{m=1}^{M} score,$$

where score represents the score at each node in the taxonomy tree, M represents the number of nodes in the taxonomy tree and similarityScore represents the similarity score calculated between the base company and test company.

Continuing with Step 508, in one or more embodiments of the invention, each score is calculated by multiplying the point value of the element in the base feature vector to the point value of the element in the test feature vector. Each score is then summed to produce a similarity score. Said another way, vector multiplication is performed on the base feature vector and test feature vector to output a similarity score. In one or more embodiments of the invention, each score may be weighted. As described above, the weight may correspond to a predefined mathematical function, including the log of the summation of the point value assigned to a node from both the base company and test company. The calculation may be represented by the following equation: weight=log(x+y), where x represents the point value at a node from a base company and y represents the point value at a node from a test company. For example, each score may be weighted by dividing each score by the log of the summation of the point value of the element in the base feature vector and the point value of the element in the test feature vector. The calculation may be represented by the following equation:

$$score = \frac{(x+y)}{\log(x+y)},$$

where x represents the point value at a node from a base company and y represents the point value at a node from a test company.

In Step 510, a determination is made whether the similarity score satisfies the similarity threshold. In one or more embodiments of the invention, the similarity score calculated in Step 508 satisfies the similarity threshold when the similarity score is equal or above the similarity threshold. Further, the similarity score does not satisfy the similarity threshold when the similarity score is below the similarity threshold.

If a determination is made that the similarity score satisfies the similarity threshold, the method may proceed to Step 512. In Step 512, a recommendation is provided. In one or more embodiments of the invention, a recommendation is a suggestion to a vendor of the base company that the test company exists and purchases similar products to the base company. In one or more embodiments of the invention, a recommendation is an advertisement to a customer of the base company that the test company sells similar products to the base company.

In Step 514, a determination is made whether a comparison of the base company with another test company is requested. In one or more embodiments of the invention, the user may be interested in finding multiple similar companies to the base company. Further, a user may need multiple comparisons before a test company is similar to the base company.

If a determination is made that the comparison of the base company with another test company is requested, the method may return to Step 508.

Returning to Step 510, if a determination is made that the similarity score does not satisfy the similarity threshold, the method may proceed to Step 514.

FIGS. 6.1-6.3 show an example in one or more embodiments of the invention. The following example is for explanatory purposes only and not intended to limit the scope of the invention.

FIGS. 6.1-6.3 show a taxonomy tree generated by the taxonomy tree generation module in the classification engine in one or more embodiments of the invention. Nodes labeled with N are parent nodes and represent classes of products. Nodes labeled with L are leaf nodes that represent an individual product. Consider the scenario in which a customer makes an online order from a deli. Following the online order from the deli, the customer receives an advertisement of a grocery store offering similar products that the customer purchased at the deli.

Alternatively, consider the scenario in which a farmer is seeking to sell products to more retailers in addition to a deli. The farmer uses the user interface of the classification engine to find similar companies to the deli. The farmer soon discovers that a grocery store is looking for a supplier and sells similar products to the deli. In contrast with the customer, the classification engine finds similar companies to suggest additional companies to the farmer rather than advertise an alternative company.

In either scenario described above, to determine whether the deli and the grocery store are similar, the deli is selected as the base company. The grocery store is selected as the test company to compare to the deli.

Turning to FIG. 6.1, the deli buys 10 units of havarti cheese that matches L1 (600), 3 units of pork tenderloin that matches L5 (602), and 4 units of chicken breast that matches L7 (604). L1 (600) is assigned a point value of 10, L5 (602) is assigned a point value of 3, and L7 (604) is assigned a point value of 4.

Turning to the first matching leaf node of the deli, the point value of L1 (600) propagates the taxonomy tree to N5 (606) that represents cheese products. N5 (606) is assigned the point value 10. The point value of N5 (606) propagates the taxonomy tree to N2 that represents dairy products. N2 (612) is assigned the point value 10. The point value of N2 (612) propagates the taxonomy tree to the root node N1 (616) that represents food products. N1 (616) is assigned the point value 10.

Turning to the next matching leaf node of the deli, the point value of L5 (602) propagates the taxonomy tree to N7 (608) that represents pork products. N7 (608) is assigned the point value 3. The point value of N7 (608) propagates the taxonomy tree to N3 (614) that represents meat products. N3 (614) is assigned the point value 3. The point value of N3 (614) propagates the taxonomy tree to the root node N1 (616) that represents food products. N1 (616) is assigned another point value of 3.

Turning to the final matching leaf node of the deli, the point value of L7 (604) propagates the taxonomy tree to N8 (610) that represents chicken products. N8 (610) is assigned the point value 4. The point value of N8 (610) propagates the taxonomy tree to N3 (614) that represents meat products. N3 (614) is assigned another point value of 4. The point value of N3 (614) propagates the taxonomy tree to the root node N1 (616) that represents food products. N1 (616) is assigned another point value of 4.

Normalization at each node highlighted in the taxonomy tree in FIG. 6.1 is performed next. The normalization of the deli point values is represented by N(deli) and is the summation of the point values assigned to the matching leaf nodes L1 (600), L5 (602), and L7 (604). N(deli)=10+103+4=17. For N3 (614) and N1 (616), where multiple point values are assigned at each node, the point values are summed and then divided by N(deli). This may be represented by the following equation:

$$y = \frac{\sum_{m=1}^{M} x}{N(\text{deli})},$$

where x represents a point value in the set of multiple point values at a node, M represents the number of point values in the set of multiple point values, and y represents the normalized point value at a node. The remaining nodes have a point value that is divided by N(deli). This may be represented by the following equation:

$$y = \frac{x}{N(\text{deli})},$$

where x represents a point value at a node and y represents the normalized point value at a node.

A base feature vector (618) is created for the deli based on the point value obtained through normalization described above. Continuing with the example, an element in the base feature vector (614) exists for each node in the taxonomy tree in FIG. 6.1. For explanatory purposes, the node that the element corresponds to is in parenthesis in the feature vector beside the point value assigned. However, multiple techniques may be used to store the base feature vector, such as by including each element and not including the node identifier or by including the node identifier and only elements having a non-zero point value.

Turning to FIG. 6.2, consider the scenario in which the grocery store buys 3 units of chicken thighs that matches L8 (620), 8 units of lettuce that matches L13 (622), and 5 units of measuring cups that does not match a leaf node in the taxonomy tree. L8 (620) is assigned a point value of 3 and L13 (622) is assigned a point value of 8.

Turning to the first matching leaf node of the grocery store, the point value of L8 (620) propagates the taxonomy tree to N8 (610) that represents chicken products. N8 (610) is assigned the point value 3. The point value of N8 (610) propagates the taxonomy tree to N3 (614) that represents meat products. N3 (614) is assigned the point value 3. The point value of N3 (614) propagates the taxonomy tree to the root node N1 (616) that represents food products. N1 (616) is assigned a point value of 3.

Turning to the final matching leaf node of the grocery store, the point value of L13 (622) propagates the taxonomy tree to N10 (624) that represents lettuce products. N10 (624) is assigned the point value 8. The point value of N10 (624) propagates the taxonomy tree to N4 (626) that represents vegetable products. N4 (626) is assigned the point value 8. The point value of N4 (626) propagates the taxonomy tree to the root node N1 (616) that represents food products. N1 (616) is assigned another point value of 8.

Normalization at each node highlighted in the taxonomy tree in FIG. 6.2 is performed next. The normalization of the grocery store point values is represented by N(grocery) and is the summation of the point values assigned to the leaf nodes L8 and L13. N(grocery)=3+8=11. For N1, where multiple point values are assigned at each node, the point values are summed and then divided by N(grocery). This may be represented by the following equation:

$$y = \frac{\sum_{m=1}^{M} x}{N(\text{grocery})},$$

where x represents a point value in the set of multiple point values at a node, M represents the number of point values in the set of multiple point values, and y represents the normalized point value at a node. The remaining nodes have a point value that is divided by N(grocery). This may be represented by the following equation:

$$y = \frac{x}{N(\text{grocery})},$$

where x represents a point value at a node and y represents the normalized point value at a node.

A test feature vector (628) is created for the grocery based on the point value obtained through normalization described above. There is an element for each node in the taxonomy tree in FIG. 6.2. For explanatory purposes, the node the element corresponds to is in parenthesis in the feature vector beside the point value assigned.

Turning to FIG. 6.3, the similarity score of the deli and grocery store is calculated. Each element of the base feature vector (618) in FIG. 6.1 is multiplied by the corresponding element in the test feature vector (628) in FIG. 6.2 to obtain a score. Each score is then summed to obtain the similarity score. This may be represented by the following equation:

$$\text{similarityScore} = \sum_{m=1}^{M} \text{score},$$

where score represents the score at each node in the taxonomy tree, M represents the number of nodes in the taxonomy tree and similarityScore represents the similarity score between the deli and grocery store.

Elements 1, 3, and 8 corresponding to nodes N1 (616), N3 (614), and N8 (610), respectively, are the elements where both the element in the base feature vector (618) and the corresponding element in the test feature vector (628) are non-zero. For this reason, the N1, N3, and N8 nodes in FIG. 6.3 are highlighted. The remaining elements have a zero in either the element of the base feature vector (618) or the element of the test feature vector (628), resulting in a multiplication product of zero. The similarity score is therefore calculated by: score(N1)+score(N3)+score(N8).

Each score is then divided by a weight. As described above, the weight may correspond to a predefined mathematical function, including the log of the summation of the point values assigned to nodes N1 (616), N3 (614), and N8 (610). Said another way, the point value assigned by the deli without normalization by N(deli) and the point value assigned by the grocery store without normalization by N(grocery) are summed. The log of the summation is then performed. W(N1) is log(17+11), W(N3) is log(7+3), and W(N8) is log(4+3). The similarity score is then calculated as follows:

$$\frac{\left(\frac{17}{N(\text{deli})}\right) \times \left(\frac{11}{N(\text{grocery})}\right)}{W(N1)} +$$

$$\frac{\left(\frac{7}{N(\text{deli})}\right) \times \left(\frac{3}{N(\text{grocery})}\right)}{W(N3)} + \frac{\left(\frac{4}{N(\text{deli})}\right) \times \left(\frac{3}{N(\text{grocery})}\right)}{W(N8)}$$

The similarity score is approximately 0.69+0.11+0.08=0.88. The similarity threshold is set to 0.80. The similarity score satisfies the similarity threshold.

If the user is the customer, the customer receives an advertisement to shop at the grocery store, since the deli is similar to the grocery store. If the user is the farmer, the farmer receives a recommendation suggesting that the farmer that supplies to the deli may sell to the grocery store as the grocery store purchases similar products to the deli.

Figure 7:
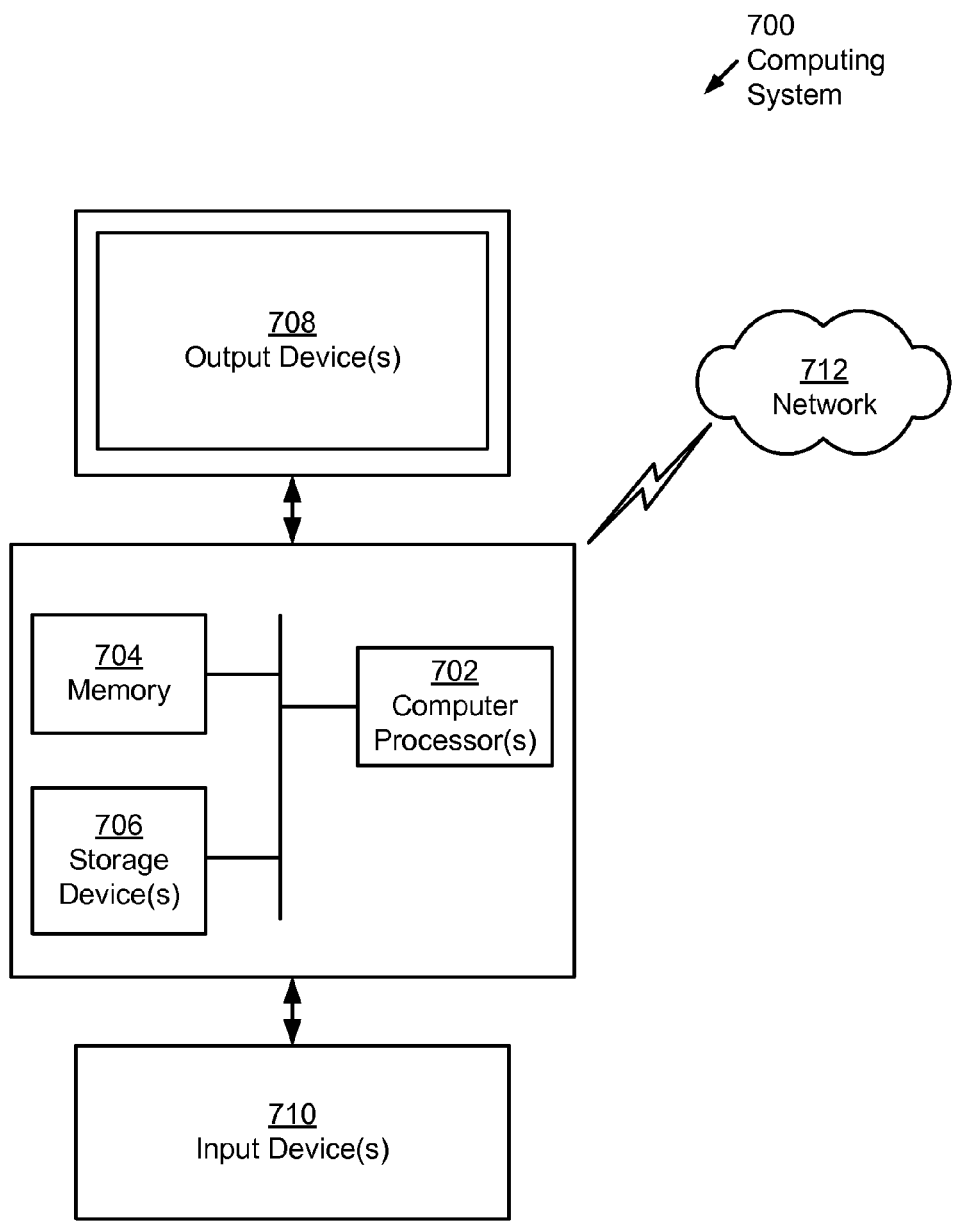
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for comparing purchase patterns, comprising:
  matching a plurality of products purchased by a base company to a plurality of leaf nodes in a taxonomy tree to obtain a plurality of matching leaf nodes, wherein the taxonomy tree is a hierarchical classification of products;
  assigning, to each of the plurality of matching leaf nodes and to each parent node of the plurality of matching leaf nodes, a point value to obtain a plurality of point values;
  creating, for the base company and by a computer processor, a base feature vector comprising the plurality of point values;
  calculating, by the computer processor, a similarity score between the base feature vector of the base company to a test feature vector of a test company; and
  providing, in response to the similarity score satisfying a similarity threshold, a recommendation, wherein the recommendation comprises an advertisement to a customer of the base company.

2. The method of claim 1, wherein matching the plurality of products comprises matching a plurality of product keywords to a plurality of keywords annotated on the plurality of leaf nodes in the taxonomy tree.

3. The method of claim 2, wherein the plurality of product keywords are extracted from product information of the plurality of products.

4. The method of claim 1, further comprising:
  extracting product information of a plurality of companies, wherein the plurality of companies comprise the base company and the test company;
  identifying the plurality of products for each company of the plurality of companies from keywords in the product information; and
  generating the taxonomy tree based on a plurality of identified products.

5. The method of claim 1, further comprising:
  performing a clustering of a plurality of feature vectors from the plurality of companies.

6. The method of claim 5, wherein the clustering of the plurality of feature vectors from the plurality of companies is based on the plurality of point values in each of the plurality of feature vectors.

7. The method of claim 1, wherein the taxonomy tree comprises the plurality of parent nodes connected from each leaf node of the plurality of leaf nodes to a root node, wherein each parent node of the plurality of parent nodes represents a class of products and each leaf node of the plurality of leaf nodes represents a product.

8. The method of claim 1, further comprising:
normalizing the point value assigned to the plurality of parent nodes.

9. The method of claim 1, wherein the recommendation indicates that the test company is an alternate vendor to the base company.

10. A system for comparing purchasing patterns, comprising:
a computer processor; and
a classification engine, executing on the computer processor, and comprising:
a feature vector generation module configured to:
match a plurality of products purchased by a base company to a plurality of leaf nodes in a taxonomy tree to obtain a plurality of matching leaf nodes, wherein the taxonomy tree is a hierarchical classification of products,
assign to each of the plurality of matching leaf nodes and to each parent node of the plurality of matching leaf nodes, a point value to obtain a plurality of point values, and
create, for the base company, a base feature vector comprising the plurality of point values, and
a similarity score generation module configured to:
calculate a similarity score between the base feature vector of the base company to a test feature vector of a test company, and
provide, in response to the similarity score satisfying a similarity threshold, a recommendation,
wherein the recommendation comprises an advertisement to a customer of the base company, and
wherein the test company is an alternate vendor to the base company.

11. The system of claim 10, further comprising:
a data repository configured to:
store the taxonomy tree;
store a plurality of feature vectors; and
store transaction records, wherein the transaction records comprise product information for the plurality of products from each company of a plurality of companies, wherein the plurality of companies comprise the base company and test company.

12. The system of claim 10, further comprising:
a user interface configured to:
receive a request to display the recommendation.

13. The system of claim 10, further comprising:
a taxonomy tree generation module configured to:
receive, from the data repository the transaction records for the plurality of products from each company of the plurality of companies;
generate the taxonomy tree from a plurality of keywords from the product information in the transaction records of the plurality of products from each company of the plurality of companies; and
store the taxonomy tree in the data repository.

14. The system of claim 10, further comprising:
a feature vector clustering module configured to:
receive, from the data repository the plurality of feature vectors; and
perform a clustering of the plurality of companies based on the plurality of feature vectors.

15. A non-transitory computer-readable storage medium storing a plurality of instructions for comparing purchase patterns, the plurality of instructions comprising functionality to:
match a plurality of products purchased by a base company to a plurality of leaf nodes in a taxonomy tree to obtain a plurality of matching leaf nodes, wherein the taxonomy tree is a hierarchical classification of products;
assign, to each of the plurality of matching leaf nodes and to each parent node of the plurality of matching leaf nodes, a point value to obtain a plurality of point values;
create, for the base company, a base feature vector comprising the plurality of point values;
calculate a similarity score between the base feature vector of the base company to a test feature vector of a test company; and
provide, in response to the similarity score satisfying a similarity threshold, a recommendation, wherein the recommendation comprises an advertisement to a customer of the base company.

16. The non-transitory computer-readable storage medium of claim 15, wherein matching the plurality of products comprises matching a plurality of product keywords to a plurality of keywords annotated on the plurality of leaf nodes in the taxonomy tree.

17. The non-transitory computer-readable storage medium of claim 16, wherein the plurality of product keywords are extracted from product information of the plurality of products.

18. The non-transitory computer-readable storage medium of claim 15, further comprises functionality to:
extract product information of a plurality of companies, wherein the plurality of companies comprise the base company and the test company;
identify the plurality of products for each company of the plurality of companies from the plurality of keywords in the product information; and
generate the taxonomy tree based on a plurality of identified products.

19. The non-transitory computer-readable storage medium of claim 15, further comprises functionality to:
perform a clustering of a plurality of feature vectors from the plurality of companies.

20. The non-transitory computer-readable storage medium of claim 19, wherein the clustering of the plurality of feature vectors from the plurality of companies is based on the plurality of point values in each of the plurality of feature vectors.

21. The non-transitory computer-readable storage medium of claim 15, wherein the taxonomy tree comprises the plurality of parent nodes connected from each leaf node of the plurality of leaf nodes to a root node, wherein each parent node of the plurality of parent nodes represents a class of products and each leaf node of the plurality of leaf nodes represents a product.

22. The non-transitory computer-readable storage medium of claim 15, further comprising functionality to:
   normalize the point value assigned to the plurality of parent nodes.

23. The non-transitory computer-readable storage medium of claim 15, wherein the recommendation indicates that the test company is an alternate vendor to the base company.

24. A method for comparing sell patterns, comprising:
   matching a plurality of products sold by a base company to a plurality of leaf nodes in a taxonomy tree to obtain a plurality of matching leaf nodes, wherein the taxonomy tree is a hierarchical classification of products;
   assigning, to each of the plurality of matching leaf nodes and to each parent node of the plurality of matching leaf nodes, a point value to obtain a plurality of point values;
   creating, for the base company and by a computer processor, a base feature vector comprising the plurality of point values;
   calculating, by the computer processor, a similarity score between the base feature vector of the base company to a test feature vector of a test company; and
   providing, in response to the similarity score satisfying a similarity threshold, a recommendation, wherein the recommendation comprises a suggestion to a vendor of the base company.

25. The method of claim 24, further comprising:
   extracting product information of a plurality of companies, wherein the plurality of companies comprise the base company and the test company;
   identifying the plurality of products for each company of the plurality of companies from keywords in the product information; and
   generating the taxonomy tree based on a plurality of identified products.

26. The method of claim 24, further comprising:
   performing a clustering of a plurality of feature vectors from the plurality of companies.

27. The method of claim 24, wherein the taxonomy tree comprises the plurality of parent nodes connected from each leaf node of the plurality of leaf nodes to a root node, wherein each parent node of the plurality of parent nodes represents a class of products and each leaf node of the plurality of leaf nodes represents a product.

28. The method of claim 24, further comprising:
   normalizing the point value assigned to the plurality of parent nodes.

29. The method of claim 24, wherein the recommendation indicates that the test company is an additional company to the base company.

* * * * *